Figure 1:
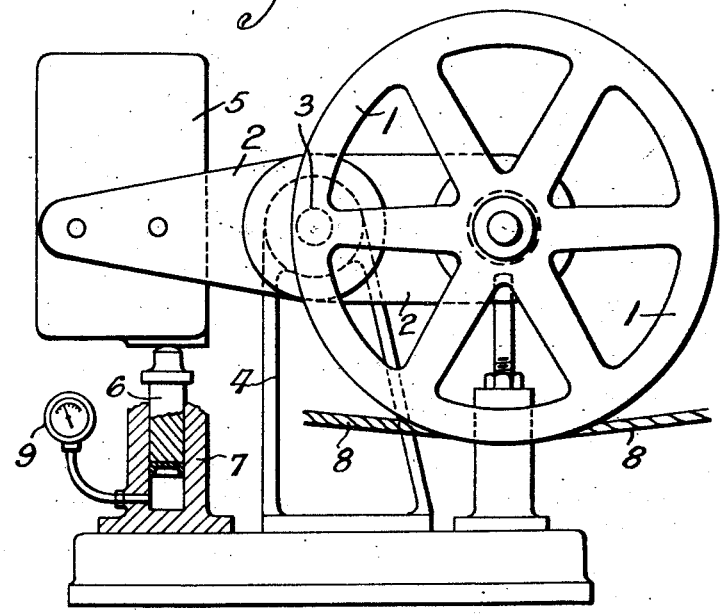

Nov. 20, 1928.                                         1,692,057
                    W. S. SMITH ET AL
       DYNAMOMETER FOR USE IN MEASURING THE TENSION
              IN A ROPE, CABLE, OR THE LIKE
                    Filed May 5, 1927        4 Sheets-Sheet 1

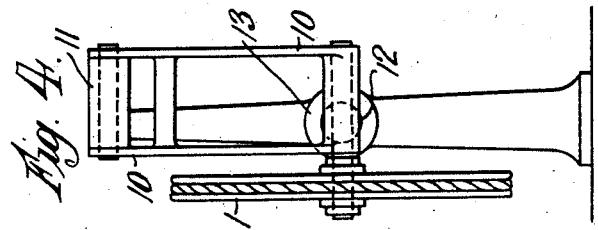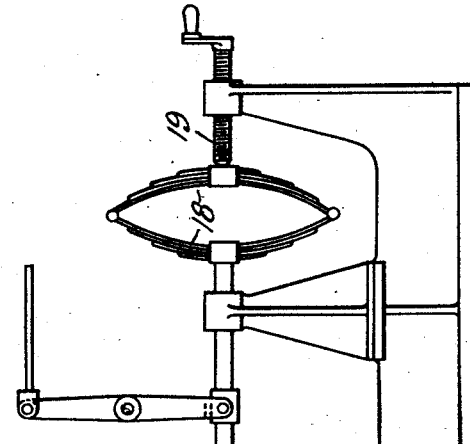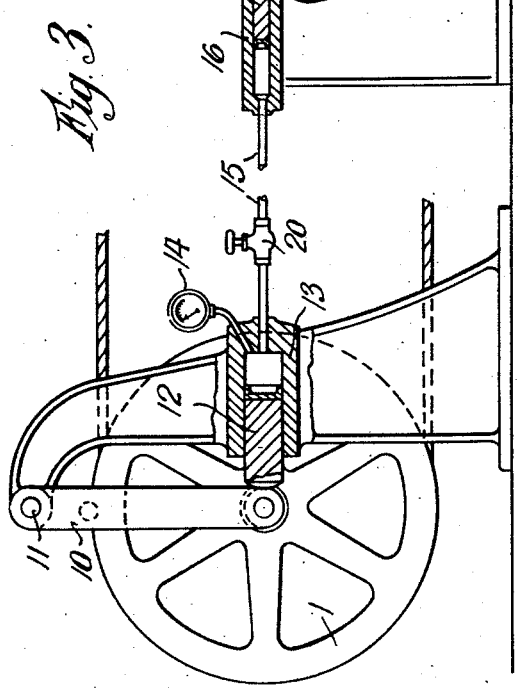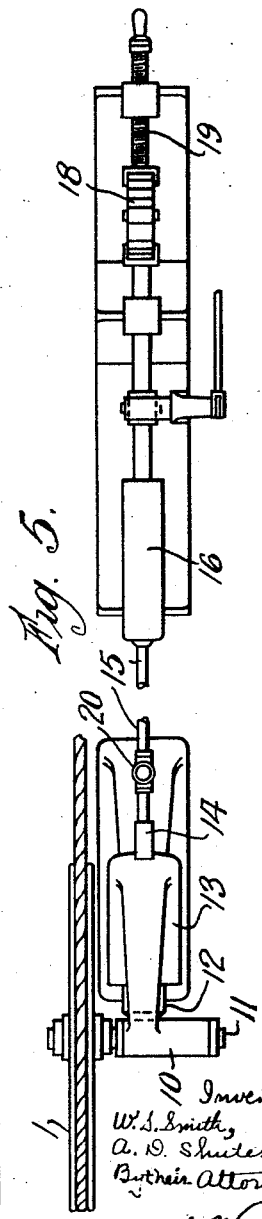

Nov. 20, 1928.
W. S. SMITH ET AL
1,692,057
DYNAMOMETER FOR USE IN MEASURING THE TENSION
IN A ROPE, CABLE, OR THE LIKE
Filed May 5, 1927
4 Sheets-Sheet 3
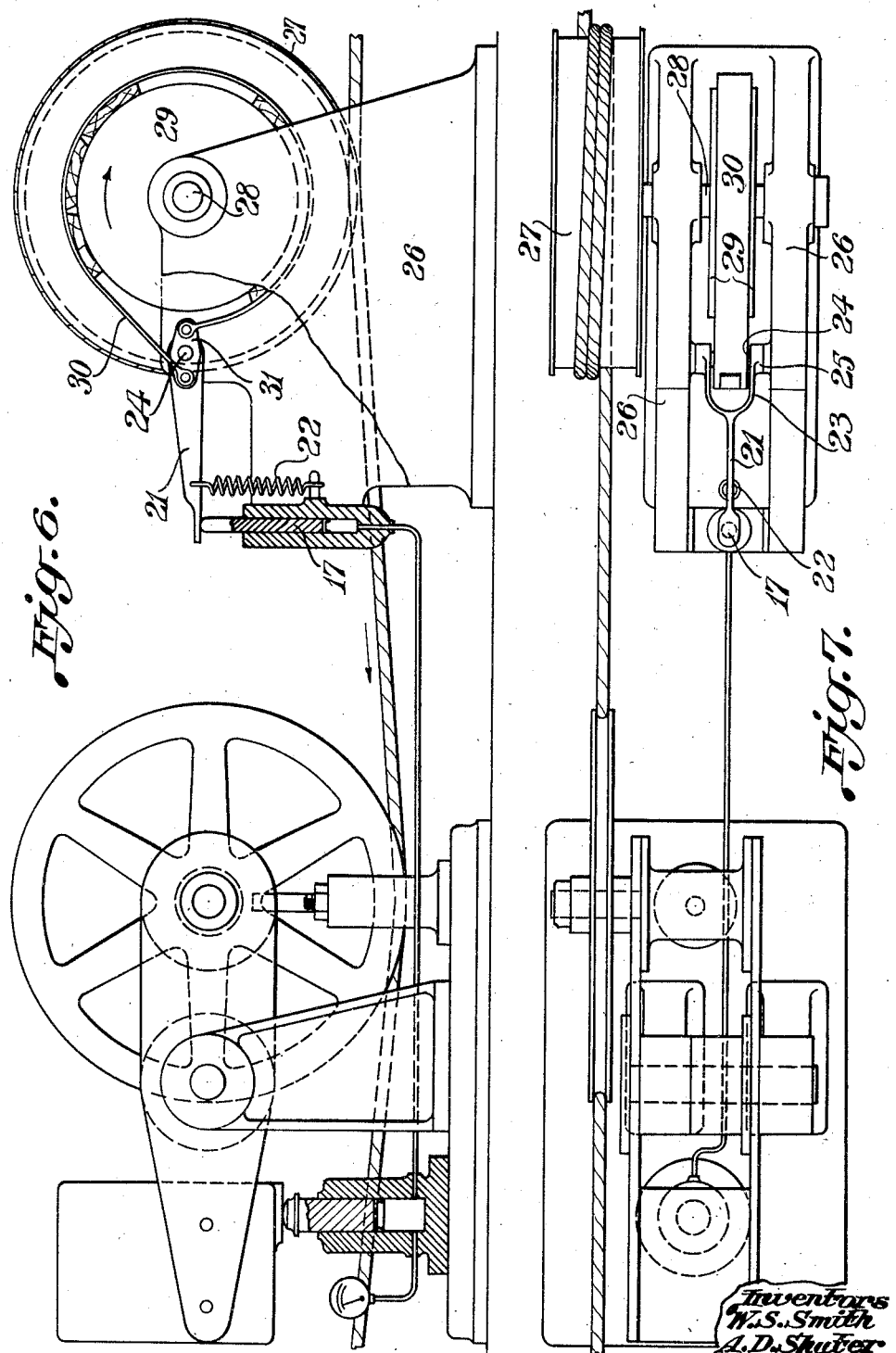

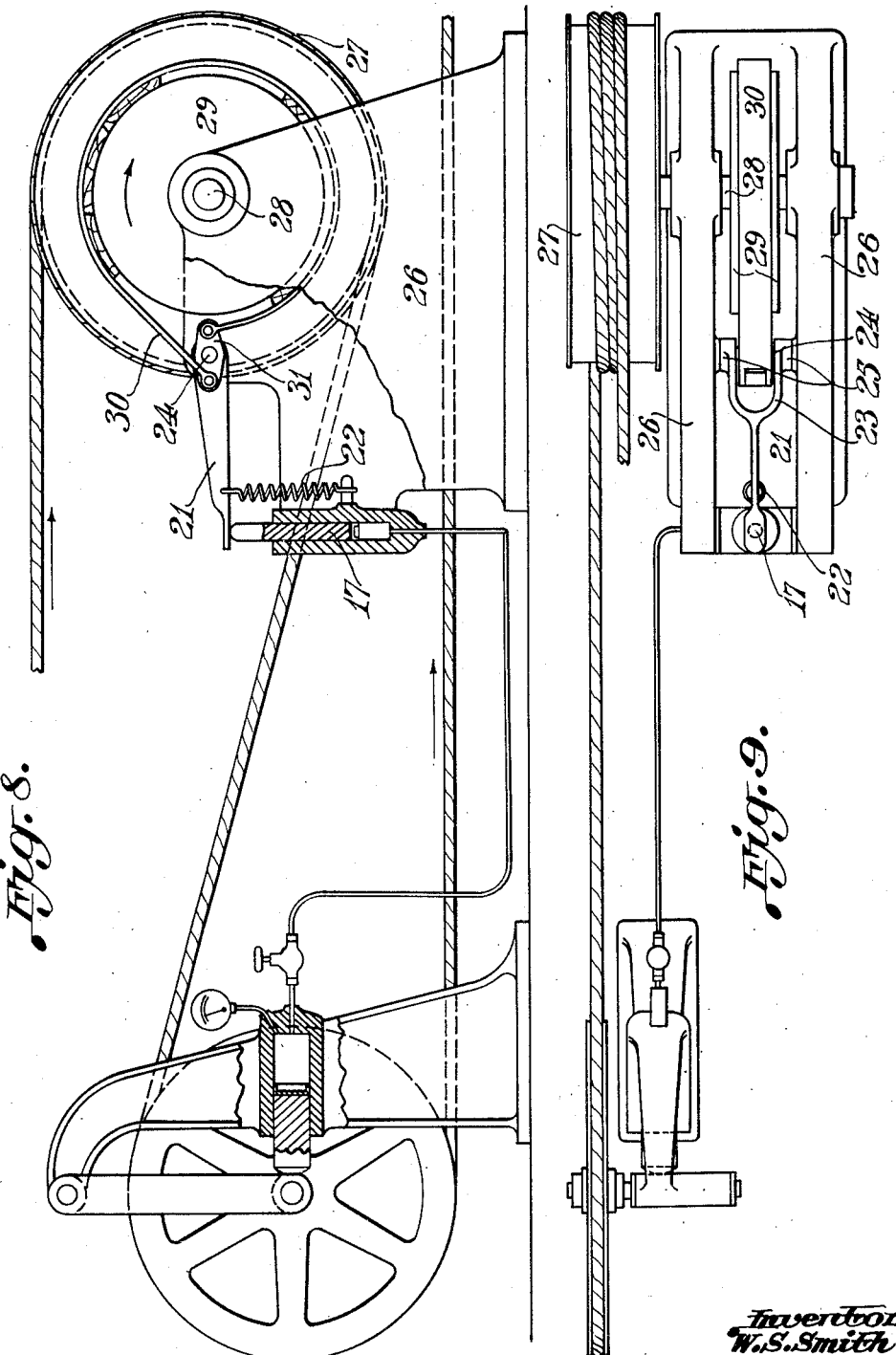

Patented Nov. 20, 1928.

1,692,057

UNITED STATES PATENT OFFICE.

WILLOUGHBY STATHAM SMITH, OF NEWTON POPPLEFORD, AND ALFRED DEVER SHUTER, OF HARROW-ON-THE-HILL, ENGLAND.

DYNAMOMETER FOR USE IN MEASURING THE TENSION IN A ROPE, CABLE, OR THE LIKE.

Application filed May 5, 1927, Serial No. 188,968, and in Great Britain February 26, 1927.

This invention relates to improvements in dynamometers and more particiularly of the type used for measuring the tension in a rope, cable or the like, which is streached between two points and which may be moving in the direction of its length.

The invention is particularly applicable to use on board a cable ship for indicating the tension of a submarine cable which is being laid, picked up or held, with reference to which the invention is described.

Hitherto it has been usual to pass the cable over two sheaves placed about fifteen feet apart, and located midway between these sheaves is a third or riding sheave, capable of sliding vertically, and which rests on the cable. A weight is used to press this sheave downwards on the cable, which is thereby deflected. The amount of this deflection depends upon the tension on the cable, and is indicated by a pointer fixed to the mounting of the riding sheave and sliding with it in relation to a vertical scale which is graduated so as to read in units of tension in the cable.

One of the objections to this arrangement is that the inertia of the weight and other moving parts sets up oscillations and, consequently, causes false readings, particularly when the ship is pitching in a heavy sea. Moreover, these oscillations react upon the cable, to cause unequal stresses in it, so that it has been customary to damp these oscillations by means of a dashpot, with the result that this instrument is unsuitable for indicating sudden changes of tension.

Another objection to this type of dynamometer is that when the tension on the cable is very heavy, the angle of deflection under the riding sheave must be very small, so that any further increase in tension alters this angle so little that excessive tension may easily pass unseen.

The object of this invention is to overcome these difficulties.

According to this invention the riding or measuring sheave, over or around which the cable is passed, is mounted in such a manner that its weight does not influence the action of the dynamometer, whilst the loading means of the dynamometer is such as not to be substantially affected by gravity.

The riding or measuring sheave may be pivotally mounted to form part of a balanced system, whereby the vertical motion of the ship has no tendency to disturb it, and for this purpose may be mounted upon a lever, pivoted to a fixed support forming a fulcrum, and on the other side of which is a counterweight arranged to balance the weight of the sheave and thus form a balanced system.

The moment of the thrust of the cable on the sheave about the fulcrum of the lever may be measured by a fluid pressure gauge or equivalent device, of that type substantially unaffected by gravity, to read upon a scale which may be calibrated in direct units of tension in the cable.

Alternatively the riding or measuring sheave may be mounted on a pivoted lever whose pivot or fulcrum is located in a vertical plane passing through the centre of gravity of the sheave. In such an arrangement it is preferable that the thrust of the cable on the sheave is measured in a horizontal plane.

According to a further feature of this invention the pressure due to the thrust of the cable on the sheave may be employed to control the tension of the cable, such as by operating the control of a clutch or brake.

Figure 2:
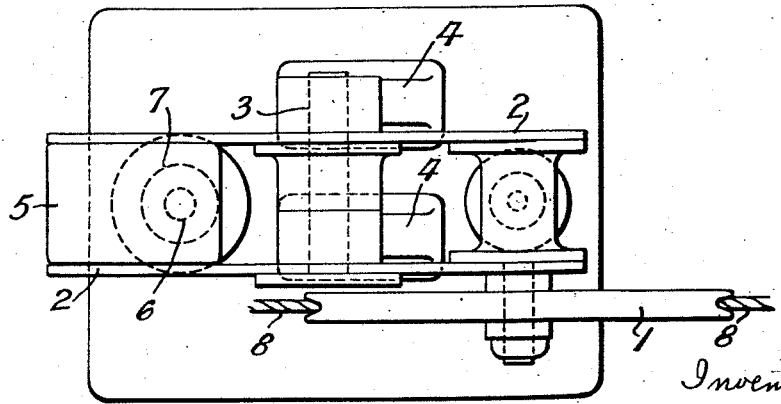

The invention is illustrated in the accompanying drawings, in which Figure 1 is an elevation, and Figure 2 a plan of a dynamometer constructed in accordance with this invention. Figures 3, 4 and 5 are respectively an elevation, side and plan view of a modification. Figure 6 is a side elevation with parts in section and Figure 7 is a top plan view showing a brake mechanism for the paying out gear employed with the form of the invention disclosed in Figures 1 and 2.

Figure 8 is a side elevation and Figure 9 a top plan view of this brake mechanism employed in connection with the form of the invention illustrated in Figures 3, 4 and 5.

Referring more particularly to Figures 1 and 2 of the drawings, a sheave 1 is mounted on one end of a lever 2, pivoted at 3 upon uprights 4. On the other end of the lever 2 is a counterweight 5, arranged so that the system comprising the sheave and the lever is balanced about its fulcrum 3. A ram 6, sliding in a cylinder 7 containing a suitable fluid, is provided, which is adapted to be engaged by the end of the lever 2, so that the thrust of the cable, shown at 8, is transmitted through the system, producing a pressure within the cylinder 7 which is indicated by a gauge 9.

When the dynamometer is not in use, an adjustable stop may be provided to prevent accidental movement.

Referring now to Figures 3, 4 and 5, the sheave 1 is mounted on a lever 10 pivoted at 11 in a plane vertically above the centre of gravity of the mass of the sheave 1, so that the weight of the sheave does not normally influence the action of the dynamometer. The lower end of the lever 10 is adapted to engage a ram 12 in a cylinder 13 containing fluid and operating a gauge 14.

In order to control the tension in the cable, the cylinder 13 communicates by means of a pipe 15 with a second cylinder 16 operating in which is a spring-controlled ram 17. The ram 17 acts either directly or through a system of levers, upon the brake of the paying-out gear, or a friction clutch in the case of picking up, in such a way that when pushed outwards by tension on the cable, it tends to release the brake or clutch, which is normally actuated by a spring or weight, and thus to reduce the tension on the cable.

The ram 17 is controlled by means of a spring 18 which resists the outward movement of the ram and maintains the pressure of the fluid.

It will be seen that the relative length of the stroke of the two rams is inversely as their areas. Hence, by suitable design, the ram 17 can be made to move through a practical working stroke by a very small movement of the ram 12, since the force exerted by the cable on the latter is very great in comparison with that required for the operation of the ram 17.

Or the ram may be used to operate an electric switch, controlling a motor or an electromagnet. A screw 19 may be provided for regulating the pressure of the spring 18, and by adjusting this screw, any desired tension may be exerted on the cable. Any unforeseen addition to this tension, such as may be caused by the pitching of the ship, instantly causes the sheave to press more heavily against the ram 12.

A slight movement of this ram causes ram 17 to be pushed outwards, reducing the pressure on the brakes or clutch, and permitting the cable to run out with sufficient velocity to release the extra stress. A reverse movement thus takes place, and thus the predetermined tension is restored.

A regulating valve 20 may be inserted between the two cylinders, in order to prevent too sudden movements, and this valve may be of the non-return type and be provided with an adjustable by-pass, in order to check sudden movements in one direction more than the other.

There is shown in Figures 6 and 7 a brake mechanism connected with the pay out gear arranged to be controlled by the form of the device shown in Figures 1 and 2. A similar brake mechanism and control is shown in Figures 8 and 9 connected to the form of the mechanism shown in Figures 3, 4 and 5. In each case the ram 17 contacts with a lever 21 which is held in contact with the ram at all times by a spring 22. The lever 21 is forked as shown at 23 at one end and is fast on a shaft 24 which is mounted in bearings 25 formed in supports 26. A paying out sheave 27 is fast on a shaft 28 carried by the supports 26. This shaft 28 is provided with a brake drum 29 with which engages a brake strap 30 connected at its ends to a rocker arm 31 fast on the shaft 24.

It is obvious that movement of the ram 17 will cause an operation of the brake and thereby control the speed at which the rope or cable passes over the sheave 27.

It is clear that the system may be arranged in a variety of ways without departing from the spirit of the invention. As an instance, the sheave could be made to lift the piston directly, while the lever only carries the counterweight. Or the lever could be dispensed with, and the counterweight suspended by a chain or rope over a pulley, but such variations do not affect the principle on which our invention is based.

What we claim is :—

1. In a dynamometer for use in measuring the tension of a cable, the combination of a support, a lever pivoted thereto, a measuring sheave mounted on one arm of the lever, a counterweight on the other arm of the lever, and a fluid pressure device for measuring the moment of the thrust of the cable on the sheave about the fulcrum of the lever.

2. In a dynamometer for use in measuring the tension of a cable, the combination of a support, a measuring sheave, means for mounting said sheave in the support so that its weight does not affect the action of the dynamometer, a fluid pressure device for measuring the thrust of the cable on the sheave, a brake controlling the tension in the cable, and a ram operated from said fluid pressure device for controlling said brake.

In testimony that we claim the foregoing as our invention, we have signed our names this 29th day of March, 1927.

WILLOUGHBY STATHAM SMITH.
ALFRED DEVER SHUTER.